(12) United States Patent
Chen

(10) Patent No.: US 6,238,672 B1
(45) Date of Patent: *May 29, 2001

(54) DIETARY SUPPLEMENTS CONTAINING DEHYDRATED CACTUS FRUIT JUICE AND GINSENG BERRY JUICE

(75) Inventor: Jau-Fei Chen, Orem, UT (US)

(73) Assignee: E. Excel International Inc., Springville, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/298,703

(22) Filed: Apr. 23, 1999

(51) Int. Cl.⁷ .............. A61K 35/78; A23L 1/30; A23L 2/00

(52) U.S. Cl. .............. 424/195.1; 426/648; 426/599; 426/655; 426/489; 426/465; 426/443; 426/658

(58) Field of Search .............. 424/195.1; 426/648, 426/599, 655, 489, 465, 443, 658

(56) References Cited

U.S. PATENT DOCUMENTS

| | | |
|---|---|---|
| 3,227,616 | 1/1966 | Heinz-Gunter et al. |
| 3,953,615 * | 4/1976 | Gupta et al. ............ 426/594 |
| 4,042,720 | 8/1977 | Forkner . |
| 4,078,092 | 3/1978 | Nishiyama ............ 426/584 |
| 4,276,890 | 7/1981 | Fichera ............ 131/270 |
| 4,281,026 * | 7/1981 | Reale ............ 426/599 |
| 4,361,554 | 11/1982 | Saunders . |
| 4,615,900 | 10/1986 | Schenz et al. ............ 426/590 |
| 4,732,773 | 3/1988 | Schott ............ 426/590 |
| 4,737,367 | 4/1988 | Langer et al. ............ 426/72 |
| 4,784,847 | 11/1988 | Zulliger-Bopp et al. ............ 424/69 |
| 4,795,638 | 1/1989 | Ayache et al. ............ 424/195.1 |
| 5,000,949 | 3/1991 | Bias . |
| 5,034,226 | 7/1991 | Beck ............ 424/195.1 |
| 5,171,577 | 12/1992 | Griat et al. ............ 424/450 |
| 5,230,889 | 7/1993 | Inoue ............ 424/195.1 |
| 5,290,605 | 3/1994 | Shapira ............ 424/439 |
| 5,466,455 | 11/1995 | Huffstutler, Jr. et al. ............ 424/401 |
| 5,470,874 | 11/1995 | Lerner ............ 514/474 |
| 5,565,199 | 10/1996 | Page et al. ............ 424/195.1 |
| 5,565,207 | 10/1996 | Kashibuchi et al. ............ 424/401 |
| 5,571,503 | 11/1996 | Mausner ............ 424/59 |
| 5,578,312 | 11/1996 | Parrinello ............ 424/401 |
| 5,595,743 | 1/1997 | Wu ............ 424/195.1 |
| 5,618,521 | 4/1997 | de Rigal et al. ............ 424/59 |
| 5,643,587 | 7/1997 | Scancarella et al. ............ 424/401 |
| 5,663,160 | 9/1997 | Meybeck et al. ............ 514/182 |
| 5,665,365 | 9/1997 | Bombardelli et al. ............ 424/401 |
| 5,676,956 | 10/1997 | Duffy et al. ............ 424/401 |
| 5,676,958 | 10/1997 | Emerson et al. ............ 424/405 |
| 5,720,962 | 2/1998 | Ivy et al. ............ 424/401 |
| 5,736,584 | 4/1998 | Kunkel ............ 514/919 |
| 5,738,887 * | 4/1998 | Wu ............ 426/51 |
| 5,744,187 | 4/1998 | Gaynor ............ 426/599 |
| 5,747,462 | 5/1998 | Fuentes ............ 514/23 |
| 5,773,014 | 6/1998 | Perrier et al. ............ 424/401 |
| 5,817,299 | 10/1998 | Manirazman ............ 424/59 |
| 5,834,044 | 11/1998 | Schmitz et al. ............ 426/73 |
| 5,840,309 | 11/1998 | Herstein et al. ............ 424/195.1 |

FOREIGN PATENT DOCUMENTS

| | | |
|---|---|---|
| 1 076 624 | 9/1993 | (CH) . |
| 1 090 988 | 8/1994 | (CH) . |
| 1090988 | 8/1994 | (CH) . |
| 1 211 403 | 3/1999 | (CH) . |
| 1211403 | 3/1999 | (CH) . |
| 1048799 | 1/1991 | (CN) . |
| 1076623 | 9/1993 | (CN) . |
| 1076624 | 9/1993 | (CN) . |
| 1097618 | 1/1995 | (CN) . |
| 1103779 | 6/1995 | (CN) . |
| 1114872 | 1/1996 | (CN) . |
| 1120410 * | 4/1996 | (CN) . |
| 1125052 * | 6/1996 | (CN) . |
| 1133142 | 10/1996 | (CN) . |
| 27 03 189 | 3/1978 | (DE) . |
| 2703189 | 8/1978 | (DE) . |
| 2 041218 | 5/1994 | (ES) . |
| 4331252 | 5/1994 | (DE) . |
| 2659014 | 9/1991 | (FR) . |
| 51-115968 | 10/1976 | (JP) . |
| 52-120154 | 10/1977 | (JP) . |
| 80022076 | 6/1980 | (JP) . |
| 58-067151 | 4/1983 | (JP) . |
| 58-67151 | 4/1983 | (JP) . |
| 59-227244 | 12/1984 | (JP) . |
| 61-085324 | 4/1986 | (JP) . |
| 61-853324 | 4/1986 | (JP) . |
| 61-092530 | 5/1986 | (JP) . |
| 63-116669 | 5/1988 | (JP) . |
| 63-192705 | 8/1988 | (JP) . |
| 5310527 | 11/1993 | (JP) . |
| 6271452 | 9/1994 | (JP) . |
| 07 267 977 | 10/1995 | (JP) . |
| 7-267977 | 10/1995 | (JP) . |
| 8332028 | 12/1996 | (JP) . |
| 8333260 | 12/1996 | (JP) . |
| 9-249576 | 9/1997 | (JP) . |
| 10-072338 | 3/1998 | (JP) . |
| 032503 * | 7/1997 | (KR) . |
| 144830 | 2/1975 | (NL) . |
| WO 93/11779 | 12/1992 | (WO) . |
| WO 9507681 | 3/1995 | (WO) . |
| WO 96 27383 | 9/1996 | (WO) . |
| 97 032 503 | 7/1993 | (ZA) . |
| 9304523 | 4/1994 | (ZA) . |

OTHER PUBLICATIONS

Loro et al. Can. J. Physiol. Pharmacol. vol. 72, Suppl. 1, p. 269 (abstract), 1994.*

Palma et al. Natural Colorants for Food, Proceed. 2nd Intl. Symp. (abstract), 1996.*

(List continued on next page.)

Primary Examiner—Christopher Tate
(74) Attorney, Agent, or Firm—Kirton & McConkie; Dale E. Hulse; Berne S. Broadbent

(57) ABSTRACT

The present invention relates to novel compositions of cactus fruit extract which are dried to a powder form for use in food products and nutritional supplements. The novel powders of the present invention may be used in food products and drinks as well as capsules or tablets.

24 Claims, No Drawings

OTHER PUBLICATIONS

Krifa et al. Annales des Falsif. vol. 87, p. 183–192 (abstract), 1994.*

Huang et al. Report of the Taiwan Sugar Res. Inst. vol. 0 (138), pp. 37–45 (abstract), 1992.*

Ewaidah et al. Intl. J. Food Sci. Technol. vol. 27 (3), pp. 353–358 (abstract), 1992.*

Taylor, M. The Opuntia: a food for the future. Proc. Oxford Symp. on Food, pp. 235–240 (abstr), 1994.*

Crosswhite, F.S. Desert Plants, vol. 2, pp. 3–61, 1980.*

Saenz et al. Acta Horticult. vol. 438, pp. 135–138 (abstract), 1997.*

Saenz et al. Lebensmittel–Wissenschaft und. Technol. vol. 26 (5), pp. 417–421 (abstract), 1993.*

Saenz et al. Alimentos. vol. 18 (3), pp. 29–32 (abstract), 1993.*

PCT search report dated Jul. 24, 2000 for PCT International application No. PCT/US00/10168.

PCT search report dated Jul. 25, 2000 for PCT International application No. PCT/US00/10112.

English language abstract for Chinese Patent No. 1125052, listed above.

English language abstract for Chinese Patent No. 1120410, listed above.

English language abstract for Chinese Patent No. 1076624, listed above.

English language abstract for Chinese Patent No. 1076623, listed above.

English language abstract for Chinese Patent No. 1048799, listed above.

English language abstract for Japanese Patent No. 5310527, listed above.

English language abstract for Japanese Patent No. 6271452, listed above.

English language abstract for Japanese Patent No. 8332028, listed above.

English language abstract for Japanese Patent No. 63192705, listed above.

English language abstract for Japanese Patent No. 61092530, listed above.

English language abstract for Japanese Patent No. 59227244, listed above.

English language abstract for Japanese Patent No. 58067151, listed above.

English language abstract for Chinese Patent No. 1133142, listed above.

English language abstract for Chinese Patent No. 1114872, listed above.

English language abstract for Chinese Patent No. 1103779, listed above.

English language abstract for Chinese Patent No. 1097618, listed above.

English language abstract for Japanese Patent No. 8333260, listed above.

English language abstract for German Patent No. DE 4331252, listed above.

English language abstract for French Patent No. 2659014, listed above.

English language abstract for German Patent No. 2703189, listed above.

English language abstract for Japanese Patent No. 52120154, listed above.

English language abstract for Japanese Patent No. 80022076, listed above.

English language abstract for Japanese Patent No. 51115968, listed above.

English language abstract for Netherlands Patent No. 144830, listed above.

* cited by examiner

DIETARY SUPPLEMENTS CONTAINING DEHYDRATED CACTUS FRUIT JUICE AND GINSENG BERRY JUICE

RELATED APPLICATIONS

The following applications are being filed concurrently herewith on this 23$^{rd}$ day of April 1999 and are incorporated herein by reference:

| Title | Atty Docket No. | application Ser. No. |
|---|---|---|
| Cactus Fruit Skin Care Products | 7537.0029 | 09/298,245 |
| Cactus Fruit Drinks and Food Products | 7537.0026 | 09/298,807 |
| Ginseng Berry Topical Applications | 7537.0027 | 09/298,702 |
| Ginseng Berry Drink and Food Compositions | 7537.0028 | 09/298,806 |
| Ginseng Berry Powder Dietary Supplements | 7537.0030 | 09/298,701 |

FIELD OF THE INVENTION

The present invention relates generally to the field of botanical and nutritional food products and more particularly to nutritional supplements prepared with powder made from the fruit of a cactus. Preferred embodiments of the present invention comprise novel compositions of cactus fruit powder and other beneficial ingredients prepared for human consumption.

BACKGROUND

The human physiological need for vitamins has been well established. Regular dietary consumption of vitamins is essential to good health. Various organizations and government agencies have published recommended quantities for vitamin consumption. One well known standard in the United States is the U.S. Recommended Daily Allowance (RDA) which recommends quantities for the daily intake of vitamins.

While the need for vitamins is well known, the average person fails to consume the recommended daily intake of vitamins through their normal diet. Often this is due to a busy work schedule that encourages the consumption of "fast food" that is high in fat and sugar content. For others, food rich in vitamin content may just not be readily available. Whatever the reason, many people do not consume enough vitamins in their daily diet.

Vitamin supplements have become common and are distributed in a variety of forms. Pills, capsules, elixirs, tablets and other forms abound on the market as a means for obtaining a proper daily vitamin intake. For some, this is an acceptable source of vitamins, however, many people cannot consume vitamins in these forms. Children and the elderly are especially averse to consumption of these products. This may be due to sensitive gag reflexes or a strong distaste for the product's form or taste. Regardless of the reason, many people find concentrated vitamin supplements unpalatable and unacceptable as a source of daily vitamin intake.

Natural foods are popular among health-conscious consumers today. Many people prefer to get their vitamins and other nutrients in a "natural" way from naturally occurring sources. "Natural" vitamins are now in high demand. These are vitamins which are found in a product in its natural state without vitamin supplements or vitamin "fortification." Because many fruits have high vitamin content, fruit flavors are often associated with healthy vitamin-rich products.

Among these natural vitamin containing foods, the health-conscious consumer often prefers a flavor which is unique or exotic and mildly sweet. This gives the perception of a healthy substance that is not high in calories. Unique and exotic tastes are often preferred and perceived to be more refreshing so long as they can be associated with a natural fruit, vegetable, herb or other natural source.

The majority of Americans, and people of many other cultures, are accustomed to consuming stimulants as a part of their daily routine. In the United States, the stimulant of choice is currently caffeine. Millions of cups of coffee are imbibed each morning to kick-start the day and throughout the day to provide a pick-me-up in the afternoon or evening. Cola drinks are also a source of caffeine which are consumed in large amounts. Other cultures prefer tea as a source of caffeine stimulant. The addictive nature of caffeine may explain its widespread acceptance and enormous consumption rate. Caffeine-containing drinks continue to be popular despite effects that are detrimental to the body. Caffeine can be detrimental to the digestive tract as well as other systems. Caffeine's addictive effects and a user's psychological dependence on caffeine's stimulation make it difficult to abandon after continued use. An alternative product which can provide gentle stimulation would be a welcome alternative to caffeine-containing drinks.

SUMMARY AND OBJECTS OF THE INVENTION

Preferred embodiments of the present invention provide a completely natural, natural-tasting, nutritional supplement which contains many essential vitamins, minerals and amino acids as well as the benefits of selected herbs and, in some embodiments, royal jelly. An unique or exotic flavor is provided through the use of cactus fruit or products created from cactus fruit or its juice. In some preferred embodiments, ginseng berry products or ginseng berry juice is combined with cactus fruit products to add nutrients and flavor.

Accordingly, it is an object of preferred embodiments of the present invention to provide a nutritional supplement with a unique or exotic flavor.

It is another object of preferred embodiments of the present invention to provide a nutritional supplement comprised of products created from natural juices with naturally occurring vitamins.

It is an additional object of preferred embodiments of the present invention to provide a source of vitamins, amino acids, minerals, herbs and/or other nutrients for those who are averse to consuming tablets, capsules and similar items.

A further object of preferred embodiments of the present invention is to provide a source of vitamins, amino acids, minerals, herbs and/or other nutrients that can be easily consumed with fast food or while the consumer is on-the-go.

An additional object of preferred embodiments of the present invention is to provide a nutritional supplement that will naturally stimulate the mind and body.

Another object of preferred embodiments of the present invention is to provide a stimulating food supplement that provides an alternative to caffeine consumption without the addictive or health-repressing qualities of caffeine.

DETAILED DESCRIPTION OF THE PREFERRED EMBODIMENTS

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

A preferred embodiment of the present invention comprises a powder made from cactus fruit and other select ingredients. A preferred genus of cactus is the Cereus genus with several preferable species such as *Cereus grandiflorus*, *Cereus giganteus* and *Cereus thurberi*. Another preferred genus is the Opuntia which includes many preferred species including *Opuntia strigil, Opuntia basilaris, Opuntia rufida, Opuntia phaeacantha, Opuntia engelmannii, Opuntia erinacea, Opuntia humifusa, Opuntia phaecantha, Opuntia chlorotica, Opuntia polycantha, Opuntia violacea, Opuntia spinosbacca, Opuntia lindheimeri* and *Opuntia macrorhiza*. The species within the Opuntia genus of cactus have relatively flat, oval-shaped pads, similar to the leaves or branches of a bush, which may or may not have spines thereon. Cactus fruit or "pears" generally grow around the perimeter of the oval-shaped pads on these cacti. In the practice of the present invention, juice or a juice/pulp mixture is derived from the cactus fruit. In some presently preferred embodiments, juice or pulp may also be derived from the cactus pads or stems.

Cactus fruit grow in several varieties with varying color, seed content, sugar content and size. Colors range from green and yellow to purple, orange and red. Fruits generally range in size from 110 grams to 150 grams. Seed content, by weight, typically ranges between 2 and 4 grams per fruit while sugar content generally ranges between 11% and 16%. Cactus fruit used in a preferred embodiment of the processes and compositions of the present invention are red with average to high sugar content obtained from the *Cereus Grandiflorus* species.

Laboratory analysis of the juice from cactus fruit used for the preferred embodiment of the present invention shows a high concentration of essential vitamins. The following Table 1 gives the result of a laboratory analysis of the cactus juice squeezed from the *Cereus Grandiflorus* cactus used in a preferred embodiment of the present invention.

TABLE 1

| Thiamin | 116.6 ug/gram of product |
|---|---|
| Riboflavin | 221.9 ug/gram of product |
| Vitamin C | 8.35 mg/gram of product |
| Vitamin A | 309 IU |
| Vitamin E | 1.36 IU |
| Vitamin D3 | 120 IU |
| Beta Carotene | 16.6 IU |
| Cyanocobalamine B12 | 91 mg/gram of product |

Cactus fruit juice has also been found to be an effective anti-oxidant. Laboratory analysis reveals that one gram of cactus fruit contains 7 times more antioxidant that 10 mg of Vitamin C. The results of these tests prove that cactus fruit juice is an excellent source of vitamins.

Cactus fruit extract has also been found to promote proliferation of normal human fibroblasts thereby promoting wound healing. The Thymidine Incorporation Assay is commonly used to study proliferation of cells exposed to various chemicals. As cells grow, they must replicate their genome with every division cycle. If radiolabeled thymidine is present in the media, the cell will import this and incorporate it into the replicating DNA. Consequently, the rate at which cells divide can be quantified by the relative amounts of labeled thymidine in the cell. The goal of this study is to determine whether the addition of Cactus fruit extract to normal and transformed cells will increase the cell proliferation.

In this study, crude cactus fruit (21.17 g) was diluted in 25 ml of sterile Hanks buffer solution. The mixture was centrifuged for 5 min @ 1460 rpm to pellet debris. The supernatant was filtered through a 0.2-$\mu$m sterile filter.

Raji cells (established, transformed human lymphocytes) and FS-10 cells (normal human foreskin fibroblasts) were grown to log phase in RPMI media. 100-$\mu$l of cell suspension was added to each of 5 wells on a 96-well plate for each dilution. Dilutions of cactus fruit extract were made in sterile Hank's buffer solution. 100-$\mu$l of each dilution was added to each well. Pure Hank's buffer was used as a control. Cells were incubated for 21 hours. $H^3$ radiolabeled thymidine was added to RPMI media at a concentration of 1-$\mu$l thymidine (15.4 Ci/mmol): 49-$\mu$l media. 50-$\mu$l of thymidine solution was added to each well, and the plate was incubated for 3 hours. After 24 hours total incubation, cells were harvested using a cell harvester. The plates were allowed to dry overnight. Radioabsorption was subsequently measured.

The addition of cactus fruit extract to Raji cells (a cancerous cell line) did not cause a significant increase in thymidine incorporation. In fact, the levels were consistently lower than controls. Normal fibroblasts grown in the presence of cactus berry extract, however, showed as high as 38.6% increase in thymidine incorporation. Repeat experiments were performed with similar results. Only the results of FS-10 normal cells have been included in this document This preliminary study gives the indication that cactus fruit extract does promote cell proliferation in normal human fibroblasts but not in transformed cells. This could play a major role in wound healing. The extent to which cactus fruit extract promotes wound healing may be determined by further analysis. Regardless of the extent of this proliferating effect, this increase in cell proliferation may aid in healing of skin wounds in the digestive tract as well as other parts of the body. Results of this analysis are shown in table 2 below.

TABLE 2

| Cactus Fruit Extract FS-10 normal human fibroblasts | | |
|---|---|---|
| Dilution Factor | Absorption | % Increase |
| 1:4 | 1031.4 | 38.6% |
| 1:9 | 961.6 | 29.3% |
| 1:49 | 978.7 | 31.6% |
| 1:99 | 914 | 22.9% |
| 1:299 | 749 | 0.7% |
| Control | 743.9 | |

Preferred embodiments of the present invention may also contain ingredients made from the ginseng berry. Although the ginseng root is sometimes used as an herbal supplement, the ginseng berry has been overlooked as a food product or medication due, at least in part, to its high seed content. Ginseng berries contain a large number of seeds which make up a large percentage of the berry's volume. These seeds must be removed in order to make a liquid or pulp suitable for conversion to a powder form.

Laboratory analysis of the juice from ginseng berries used for preferred embodiments of the composition of the present invention shows a high concentration of essential vitamins. The following Table 3 gives the result of a laboratory analysis of the essential vitamins and ingredients found in ginseng berry juice.

TABLE 3

| | |
|---|---|
| Riboflavin | 171.9 ug/gram of product |
| Vitamin C | No |
| Vitamin A | 109 IU |
| Vitamin E | 1.5 IU |
| Vitamin D3 | No |
| Beta Carotene | 16.9 IU |

Advantageously, ginseng berry juice also acts as an antioxidant. Laboratory analysis reveals that one gram of ginseng berry contains 1.4 times more antioxidant that 10 mg of Vitamin C.

Modern machinery may be used to produce juice from cactus fruit or ginseng berries, however a preferred method of the present invention comprises a manual process.

The skin of the cactus fruit is peeled off by hand, using a knife, leaving the soft red meat of the fruit exposed. Seeds are then removed by filtration through a coarse screen. The remaining meat is squeezed in a press to remove as much juice as can be practically removed. The squeezed meat is subsequently blended, preferably with a mixer-type appliance and filtered through a 0.2 micron filter using a micro-filtration system. Cactus pads are processed in a similar way. Juice is extracted from cactus pads and cactus fruit separately so that the two juices may be blended in specific proportions.

Juice is extracted from ginseng berries in much the same way as cactus except the berries are not peeled before crushing. Whole ginseng berries are mixed and crushed in a press thereby removing the majority of juice. Seeds are then removed from the juice by filtration through a coarse screen filter. When a solids-free liquid is desired, the juice is further filtered in a 0.2 micron micro-filtration system to remove finer solids. Some solids content may be acceptable or desired to improve texture or add fiber to the final product. When this is the case, the micro-filtration step may be omitted.

After juice has been extracted, it is blended with other natural ingredients which add flavor, sweetness and other nutritional and physiological benefits.

Application of natural herb products along with the beneficial vitamins contained in cactus fruit and ginseng berry juice may also increase health and vitality. The effects of various herbs and plant products are beneficial to the nervous, digestive and circulatory systems as well as other physiological functions. Herbs which, when consumed, are beneficial to one's health and vitality may be considered to be "natural health promoting ingredients." The combination of herbal ingredients with healthful and rejuvenating cactus fruit juice products offers the health advantages of natural vitamins and herbs in a powdered supplement that can be added to myriad food products.

Ginseng root also has beneficial physiological effects. It is believed to help regulate blood pressure and increase the body's resistance to adverse physical, chemical and biological influences. Ginseng root can stimulate physical and mental activity and protect against the adverse effects of mental and physical stress. It may also improve concentration and stimulate brain cells. Ginseng root may be considered to be a natural health promoting ingredient or an herbal stimulant. In the prior art, like some vitamins, ginseng root is often offered in capsules or tablets in a raw form. This can be difficult for some to ingest due to gag reflexes, physical impairment or psychological aversion to tablet or capsule consumption.

The powdered food supplements of the present invention allow a user to benefit from many of the beneficial effects of cactus fruit, ginseng berry and ginseng root without the requirement of ingesting tablet or capsules. For those who prefer tablets or capsules, the powder product of the present invention may be pressed into tablets or dispensed in capsules as desired.

Preferred embodiments of the present invention combine the juice or extract of cactus fruit with herbal supplements and stimulants and other natural health promoting ingredients to create a powdered food supplement that provides a great variety of ingredients essential to health and vitality and which can be added to myriad food products including, but not limited to soups, drinks, sauces, salad dressings, breads, pastas and any other foods into which a powder may be incorporated.

Cactus fruit juice may be concentrated by known techniques to form a concentrated extract or syrup. This concentration may be performed on the pure juice of the cactus fruit or it may be performed after mixing the juice with other ingredients. This concentrated extract can then be dried to a powder form. When more fiber or texture is desired, the final filtration step of the juice making process using a 0.2 micron filter may be omitted or replaced with a step which utilizes a coarser filter as described in the powder making processes below. Alternatively, fiber and texture producing ingredients may be added as needed for powder texture and consistency.

The powder of the present invention may be created from cactus fruit juice and/or pulp either before or after addition of other ingredients. The cactus fruit is crushed and squeezed after which the seeds are removed by filtration. This creates a slurry solution which can be further processed into a powder.

Under one method of the present invention the slurry solution is dried by a hot air drying method wherein the slurry is placed on a conveyor belt exposed to extremely hot air. Once dry, the product is ground to a specific size.

Another drying method used to create the powder of the present invention employs a freeze-drying method wherein the slurry is frozen and then dehydrated in a vacuum. The resulting dehydrated product is then ground to the desired size.

In yet another, alternative drying method for producing the powdered products of the present invention, the slurry solution is further filtered using a 0.2 micron micro-filtration system to produce a liquid product. All particles of the fruit and seeds are thereby removed. The liquid product is then spray-dried to powder form. In the spray-drying process the liquid product is sent to an atomizer which uses a nozzle or centrifugal rotating wheel to atomize the liquid product into a spray. Droplets created by the atomizer contain both water and cactus fruit solids. This atomized spray is sent to a drying chamber with a controlled temperature and air flow. Atomized droplets are kept in contact with the heated air until the desired moisture content is achieved. During this process, the droplets become particles which are subsequently separated from the air stream. The resulting particles may then be ground to a finer powder if desired.

Regardless of the drying process used, the powder may be blended with other ingredients to create the novel vitamin-rich and stimulating powdered food supplements of the present invention.

After the powder is formed, it may be used directly in powder form as an ingredient in food or drink products. The powder may also be dispensed into capsules. In some embodiments, tablets may also be formed from the powder of the present invention.

The following tables further illustrate the ingredients currently used in preferred embodiments of the present invention.

EXAMPLE 1

| | |
|---|---|
| cactus fruit | 20% |
| mint | 8% |
| silver flower | 8% |
| chuan xiong root | 8% |
| golden bell fruit | 8% |
| Chinese catnip | 6% |
| bell flower root | 6% |
| American lovage root | 6% |
| angelica root | 6% |
| licorice | 6% |
| bamboo leaf | 6% |
| burdock seed | 6% |
| reed root | 6% |

EXAMPLE 2

| | |
|---|---|
| Cactus fruit | 22% |
| ginseng root | 12% |
| atractylodis root | 8% |
| poria (mushroom powder) | 10% |
| licorice | 8% |
| pinellia root | 8% |
| orange peel | 8% |
| cinnamon bark | 6% |
| fennel seed | 6% |
| amonium seed | 6% |
| mint | 6% |

EXAMPLE 3

| | |
|---|---|
| Cactus fruit | 20% |
| cassia seed | 12% |
| akebia stem | 12% |
| alisma tuber | 12% |
| cnidium | 12% |
| atractykides rhizome | 12% |
| siler | 12% |
| magnolia flower | 8% |

EXAMPLE 4

| | |
|---|---|
| Cactus fruit | 20% |
| Chinese yam | 8% |
| forty knot root | 8% |
| leek seed | 8% |
| poria (mushroom powder) | 8% |
| cornel fruit | 8% |
| papermulberry | 8% |
| eucommia bark | 8% |
| mongoliavine fruit | 8% |
| morinda root | 8% |
| broomrape | 2% |
| senega root | 2% |
| fennel seed | 2% |
| lycium fruit | 2% |

EXAMPLE 5

| | |
|---|---|
| cactus fruit | 20% |
| mint | 10% |
| silver flower | 10% |
| chuan xiong | 10% |
| yeuan wu root | 10% |
| angelica root | 10% |
| golden bell fruit | 10% |
| ji tsau herb | 10% |
| white willow bark | 10% |

EXAMPLE 6

| | |
|---|---|
| cactus fruit | 20% |
| mint | 7% |
| silver flower | 7% |
| chuan xiong root | 7% |
| golden bell fruit | 7% |
| chinese catnip | 7% |
| bell flower root | 7% |
| american lovage root | 7% |
| angelica root | 7% |
| licorice | 7% |
| bamboo leaf | 7% |
| burdock seed | 5% |
| reed root | 5% |

EXAMPLE 7

| | |
|---|---|
| cactus fruit | 20% |
| ginseng root, | 8% |
| atractylodis root | 8% |
| poria (mushroom powder) | 8% |
| licorice, | 8% |
| pinellia root | 8% |
| orange peel | 8% |
| cinnamon bark | 8% |
| fennel seed | 8% |
| ammonium seed | 8% |
| mint | 8% |

EXAMPLE 8

| | |
|---|---|
| cactus fruit | 30% |
| cassia seed | 10% |
| akebia stem | 10% |
| alisma tuber | 10% |
| cnidium | 10% |
| atractykides rhizome | 10% |
| silver | 10% |
| magnolia flower | 10% |

EXAMPLE 9

| | |
|---|---|
| cactus fruit | 20% |
| chinese yam | 7% |
| forty knot root | 7% |
| leek seed | 7% |
| poria (mushroom powder) | 7% |
| cornel fruit | 7% |

-continued

| | |
|---|---|
| papermulberry | 7% |
| eucommia bark | 7% |
| mongoliavine fruit | 7% |
| morinda root | 7% |
| broomrape | 7% |
| senega root | 4% |
| fennel seed | 3% |
| lycium fruit | 3% |

EXAMPLE 10

| | |
|---|---|
| cactus fruit extract | 30% |
| camellia flower | 20% |
| silver flower | 20% |
| jasmine flowers | 20% |
| licorice root | 10% |

EXAMPLE 11

| | |
|---|---|
| cactus fruit extract | 30% |
| Rice sprouts | 14% |
| barley sprouts | 14% |
| Chinese plum | 14% |
| orange peel | 14% |
| radish | 14% |

EXAMPLE 12

| | |
|---|---|
| cactus fruit extract | 40% |
| Cassia tora | 10% |
| ganoderma | 10% |
| *Lentinus edodes* (Shiitake Mushroom) | 10% |
| asparagus | 10% |
| mulberry | 10% |
| lemon | 10% |

EXAMPLE 13

| | |
|---|---|
| cactus fruit extract | 30% |
| Soybean extract | 14% |
| carrot extract | 14% |
| Ji-ling Genseng | 14% |
| licorice root | 14% |
| tangerine peel | 14% |

EXAMPLE 14

| | |
|---|---|
| cactus fruit extract | 20% |
| Soybean | 13% |
| lotus seed | 13% |
| strawberry | 15% |
| pineapple juice concentrate | 13% |
| pear juice concentrate | 13% |
| vanilla | 13% |

EXAMPLE 15

| | |
|---|---|
| cactus fruit extract | 20% |
| Lotus root | 5% |
| rice | 5% |
| barley | 5% |
| lotus seed | 5% |
| apple | 5% |
| ganoderma | 5% |
| pearl powder | 5% |
| strawberry | 10% |
| blueberry | 10% |
| lemon | 10% |
| pineapple | 10% |
| vanilla | 5% |

EXAMPLE 16

| | |
|---|---|
| cactus fruit extract | 25% |
| Barley sprouts | 15% |
| rice sprouts | 15% |
| Chinese plum | 15% |
| orange peel | 15% |
| Chrysanthemum flower | 15% |

EXAMPLE 17

| | |
|---|---|
| cactus fruit extract | 60% |
| Stevia | 40% |

EXAMPLE 18

| | |
|---|---|
| cactus fruit extract | 20% |
| Soybeans | 4% |
| grape juice | 4% |
| pear juice | 4% |
| cactus | 4% |
| pineapple | 4% |
| grapes | 4% |
| cantaloupe | 4% |
| carrot | 4% |
| asparagus | 4% |
| banana | 4% |
| barley | 4% |
| citrus peel | 4% |
| grapefruit | 4% |
| honeydew | 4% |
| mushroom | 4% |
| broccoli | 4% |
| cabbage | 4% |
| peas | 4% |
| kelp | 4% |
| spinach | 4% |

EXAMPLE 19

| | |
|---|---|
| cactus fruit extract | 20% |
| soybean | 4% |
| peach | 4% |
| grape juice | 4% |
| pear juice | 4% |

-continued

| | |
|---|---|
| cactus | 4% |
| citrus peel | 4% |
| grapes | 4% |
| mushroom | 4% |
| cantaloupe | 4% |
| carrot | 4% |
| grapefruit | 4% |
| honeydew | 4% |
| asparagus | 4% |
| barley | 4% |
| broccoli | 4% |
| cabbage | 4% |
| pear | 4% |
| peas | 4% |
| kelp | 4% |
| spinach | 2% |
| tomato | 2% |

EXAMPLE 20

| | |
|---|---|
| cactus fruit extract | 25% |
| Chinese Dodder | 15% |
| Chrysanthemum Extract | 15% |
| Ginseng | 15% |
| Chinese Privet | 15% |
| Pearl Extract | 15% |

EXAMPLE 21

| | |
|---|---|
| cactus fruit extract | 20% |
| Jing-jie | 15% |
| Wild ginger | 15% |
| fang-feng root | 15% |
| licorice root | 15% |
| menthol leaf | 10% |
| peppermint | 10% |

EXAMPLE 22

| | |
|---|---|
| cactus fruit extract | 20% |
| chinese lovage root | 15% |
| licorice root | 15% |
| chinese date | 15% |
| peach | 15% |
| dong quai | 10% |
| ginseng | 10% |

EXAMPLE 23

| | |
|---|---|
| cactus fruit extract | 20% |
| perilla | 16% |
| tangerine peel | 16% |
| red date | 16% |
| ginger root | 16% |
| licorice root | 16% |

EXAMPLE 24

| | |
|---|---|
| cactus fruit extract | 20% |
| pear | 15% |
| luffa | 15% |
| red date | 15% |
| dong quai | 10% |
| ginseng root | 15% |
| royal jelly | 10% |

EXAMPLE 25

| | |
|---|---|
| cactus fruit extract | 20% |
| cassia toa | 15% |
| chinese date | 15% |
| peach | 15% |
| ginger root | 15% |
| tangerine peel | 15% |
| chrysanthemum extract | 5% |

EXAMPLE 26

| | |
|---|---|
| cactus fruit extract | 40% |
| luffa | 30% |
| ganoderma | 30% |

EXAMPLE 27

| | |
|---|---|
| cactus fruit extract | 30% |
| black bean | 14% |
| loutus leaf | 14% |
| chrysanthemum extract | 14% |
| reed rhizome | 14% |
| chinese date | 14% |

EXAMPLE 28

| | |
|---|---|
| cactus fruit extract | 40% |
| bee pollen | 15% |
| ginseng | 15% |
| licorice root | 15% |
| tangerine peel | 15% |

EXAMPLE 29

| | |
|---|---|
| cactus fruit extract | 40% |
| grape seed extract | 30% |
| cassia tora extract | 30% |

EXAMPLE 30

| cactus fruit extract | 60% |
|---|---|
| angelica sinensis (Dong Quai) | 40% |

EXAMPLE 31

| cactus fruit | 20% |
|---|---|
| ginseng berry | 10% |
| mint | 7% |
| silver flower | 7% |
| chuan xiong root | 7% |
| golden bell fruit | 7% |
| Chinese catnip | 7% |
| bell flower root | 7% |
| American lovage root | 7% |
| angelica root | 7% |
| licorice | 4% |
| bamboo leaf | 4% |
| burdock seed | 3% |
| reed root | 3% |

EXAMPLE 32

| Cactus fruit | 20% |
|---|---|
| ginseng berry | 10% |
| ginseng root | 7% |
| atractylodis root | 7% |
| poria (mushroom powder) | 7% |
| licorice | 7% |
| pinellia root | 7% |
| orange peel | 7% |
| cinnamon bark | 7% |
| fennel seed | 7% |
| amonium seed | 7% |
| mint | 7% |

EXAMPLE 33

| cactus fruit | 20% |
|---|---|
| cassia seed | 10% |
| akebia stem | 10% |
| ginseng berry | 10% |
| alisma tuber | 10% |
| cnidium | 10% |
| atractykides rhizome | 10% |
| siler | 10% |
| magnolia flower | 10% |

EXAMPLE 34

| cactus fruit | 20% |
|---|---|
| Chinese yam | 7% |
| forty knot root | 7% |
| ginseng berry | 7% |
| leek seed | 7% |
| poria (mushroom powder) | 7% |
| cornel fruit | 7% |
| papermulberry | 7% |
| eucommia bark | 7% |
| mongoliavine fruit | 4% |

-continued

| morinda root | 4% |
|---|---|
| broomrape | 4% |
| senega root | 4% |
| fennel seed | 4% |
| lycium fruit | 4% |

EXAMPLE 35

| cactus fruit | 20% |
|---|---|
| ginseng berry | 20% |
| mint | 8% |
| silver flower | 8% |
| chuan xiong | 8% |
| yeuan wu root | 8% |
| angelica root | 8% |
| golden bell fruit | 8% |
| ji tsau herb | 8% |
| white willow bark | 4% |

EXAMPLE 36

| cactus fruit | 20% |
|---|---|
| ginseng berry | 20% |
| mint | 5% |
| silver flower | 5% |
| chuan xiong root | 5% |
| golden bell fruit | 5% |
| chinese catnip | 5% |
| bell flower root | 5% |
| american lovage root | 5% |
| angelica root | 5% |
| licorice | 5% |
| bamboo leaf | 5% |
| burdock seed | 5% |
| reed root | 5% |

EXAMPLE 37

| cactus fruit | 20% |
|---|---|
| ginseng berry | 20% |
| ginseng root, | 10% |
| atractylodis root | 6% |
| poria (mushroom powder) | 6% |
| licorice, | 6% |
| pinellia root | 6% |
| orange peel | 6% |
| cinnamon bark | 6% |
| fennel seed | 6% |
| ammonium seed | 6% |
| mint | 2% |

EXAMPLE 38

| cactus fruit | 20% |
|---|---|
| cassia seed | 10% |
| akebia stem | 10% |
| ginseng berry | 10% |
| alisma tuber | 10% |
| cnidium | 10% |
| atractykides rhizome | 10% |

| | |
|---|---|
| silver | 10% |
| magnolia flower | 10% |

EXAMPLE 39

| | |
|---|---|
| cactus fruit | 20% |
| chinese yam | 6% |
| forty knot root | 6% |
| ginseng berry | 10% |
| leek seed | 6% |
| poria (mushroom powder) | 6% |
| cornel fruit | 6% |
| papermulberry | 6% |
| eucommia bark | 6% |
| mongoliavine fruit | 6% |
| morinda root | 6% |
| broomrape | 6% |
| senega root | 4% |
| fennel seed | 3% |
| lycium fruit | 3% |

EXAMPLE 40

| | |
|---|---|
| cactus fruit extract | 40% |
| ginseng berry extract | 20% |
| camellia flower | 10% |
| silver flower | 10% |
| jasmine flowers | 10% |
| licorice root | 10% |

EXAMPLE 41

| | |
|---|---|
| cactus fruit extract | 40% |
| Rice sprouts | 12% |
| barley sprouts | 12% |
| Chinese plum | 12% |
| orange peel | 12% |
| radish | 12% |

EXAMPLE 42

| | |
|---|---|
| cactus fruit extract | 25% |
| ginseng berry extract | 15% |
| Cassia tora | 10% |
| ganoderma | 10% |
| *Lentinus edodes* (Shiitake Mushroom) | 10% |
| asparagus | 10% |
| mulberry | 10% |
| lemon | 10% |

EXAMPLE 43

| | |
|---|---|
| cactus fruit extract | 30% |
| ginseng berry extract | 20% |
| Soybean extract | 10% |

| | |
|---|---|
| carrot extract | 10% |
| Ji-ling Genseng | 10% |
| licorice root | 10% |
| tangerine peel | 10% |

EXAMPLE 44

| | |
|---|---|
| cactus fruit extract | 25% |
| ginseng berry extract | 15% |
| soybean | 10% |
| lotus seed | 10% |
| strawberry | 10% |
| pineapple juice concentrate | 10% |
| pear juice concentrate | 10% |
| vanilla | 10% |

EXAMPLE 45

| | |
|---|---|
| cactus fruit extract | 30% |
| ginseng berry extract | 30% |
| Lotus root | 5% |
| rice | 5% |
| barley | 5% |
| lotus seed | 5% |
| apple | 5% |
| ganoderma | 5% |
| pearl powder | 5% |
| strawberry | 5% |
| blueberry | 5% |
| lemon | 5% |
| pineapple | 5% |
| vanilla | 5% |

EXAMPLE 46

| | |
|---|---|
| cactus fruit extract | 30% |
| ginseng berry extract | 20% |
| Barley sprouts | 10% |
| rice sprouts | 10% |
| Chinese plum | 10% |
| orange peel | 10% |
| Chrysanthemum flower | 10% |

EXAMPLE 47

| | |
|---|---|
| cactus fruit extract | 35% |
| ginseng berry extract | 35% |
| Stevia | 30% |

EXAMPLE 48

| | |
|---|---|
| cactus fruit extract | 14% |
| ginseng berry extract | 6% |
| Soybeans | 4% |
| grape juice | 4% |

-continued

| | |
|---|---|
| pear juice | 4% |
| cactus | 4% |
| pineapple | 4% |
| grapes | 4% |
| cantaloupe | 4% |
| carrot | 4% |
| asparagus | 4% |
| banana | 4% |
| barley | 4% |
| citrus peel | 4% |
| grapefruit | 4% |
| honeydew | 4% |
| mushroom | 4% |
| broccoli | 4% |
| cabbage | 4% |
| peas | 4% |
| kelp | 4% |
| spinach | 4% |

EXAMPLE 49

| | |
|---|---|
| cactus fruit extract | 12% |
| ginseng berry extract | 6% |
| soybeans | 4% |
| peach | 4% |
| grape juice | 4% |
| pear juice | 4% |
| cactus | 4% |
| citrus peel | 4% |
| grapes | 4% |
| mushroom | 4% |
| cantaloupe | 4% |
| carrot | 4% |
| grapefruit | 4% |
| honeydew | 4% |
| asparagus | 4% |
| barley | 4% |
| broccoli | 4% |
| cabbage | 4% |
| pear | 4% |
| peas | 4% |
| kelp | 4% |
| spinach | 4% |
| tomato | 2% |

EXAMPLE 50

| | |
|---|---|
| cactus fruit extract | 30% |
| ginseng berry extract | 20% |
| Chinese Dodder | 10% |
| Chrysanthemum Extract | 10% |
| Ginseng | 10% |
| Chinese Privet | 10% |
| Pearl Extract | 10% |

EXAMPLE 51

| | |
|---|---|
| cactus fruit extract | 25% |
| ginseng berry extract | 15% |
| Jing-jie | 10% |
| Wild ginger | 10% |
| fang-feng root | 10% |
| licorice root | 10% |

-continued

| | |
|---|---|
| menthol leaf | 10% |
| peppermint | 10% |

EXAMPLE 52

| | |
|---|---|
| cactus fruit extract | 25% |
| ginseng berry extract | 15% |
| chinese lovage root | 10% |
| licorice root | 10% |
| chinese date | 10% |
| peach | 10% |
| dong qaui | 10% |
| ginseng | 10% |

EXAMPLE 53

| | |
|---|---|
| cactus fruit extract | 30% |
| ginseng berry extract | 20% |
| perilla | 10% |
| tangerine peel | 10% |
| red date | 10% |
| ginger root | 10% |
| licorice root | 10% |

EXAMPLE 54

| | |
|---|---|
| cactus fruit extract | 25% |
| ginseng berry extract | 15% |
| pear | 10% |
| luffa | 10% |
| red date | 10% |
| dong quai | 10% |
| ginseng | 10% |
| royal jelly | 10% |

EXAMPLE 55

| | |
|---|---|
| cactus fruit extract | 25% |
| ginseng berry extract | 15% |
| cassia toa | 10% |
| chinese date | 10% |
| peach | 10% |
| ginger root | 10% |
| tangerine peel | 10% |
| chrysanthemum extract | 10% |

EXAMPLE 56

| | |
|---|---|
| cactus fruit extract | 40% |
| ginseng berry extract | 40% |
| luffa | 10% |
| ganoderma | 10% |

EXAMPLE 57

| | |
|---|---|
| cactus fruit extract | 30% |
| ginseng berry extract | 20% |
| black bean | 10% |
| loutus leaf | 10% |
| chrysanthemum extract | 10% |
| reed rhizome | 10% |
| chinese date | 10% |

EXAMPLE 58

| | |
|---|---|
| cactus fruit extract | 25% |
| ginseng berry extract | 15% |
| bee pollen | 15% |
| ginseng | 15% |
| licorice root | 15% |
| tangerine peel | 15% |

EXAMPLE 59

| | |
|---|---|
| cactus fruit extract | 35% |
| ginseng berry extract | 25% |
| grape seed extract | 20% |
| cassia tora extract | 20% |

EXAMPLE 60

| | |
|---|---|
| cactus fruit extract | 50% |
| ginseng berry extract | 35% |
| angelica sinensis (Dong Quai) | 15% |

What is claimed is:

1. A solid dietary supplement, comprising:
   dehydrated cactus fruit juice; and
   dehydrated ginseng berry juice.

2. The solid dietary supplement of claim 1 further comprising a natural health promoting ingredient in addition to said dehydrated cactus fruit juice and said dehydrated ginseng berry juice.

3. The solid dietary supplement of claim 1 further comprising an herbal ingredient in addition to said dehydrated cactus fruit juice and said dehydrated ginseng berry juice.

4. The solid dietary supplement of claim 1 further comprising ginseng root.

5. The solid dietary supplement of claim 1 further comprising an ingredient selected from the group consisting of akebia stem, alisma tuber, american lavage root, ammonium seed, angelica root, angelica sinensis (Dong Quai), apple, asparagus, atractykides rhizome, atractylodis root, bamboo leaf, banana, barley sprouts, barley, bee pollen, bell flower root, black bean, blueberry, broccoli, broomrape, burdock seed, cabbage, cactus pads, cactus stems, camellia flower, cantaloupe, carrot extract, carrot, Cassia seed, Cassia toa, Cassia tora extract, Cassia tora, Chinese date, Chinese yam, Chinese lovage root, Chinese catnip, Chinese plum, Chinese Dodder, Chinese Privet, chrysanthemum extract, Chrysanthemum flower, chuan xiong root, chuan xiong, cinnamon bark, citrus peel, cnidium, cornel fruit, dong quai, eucommia bark, fang-feng root, fennel seed, forty knot root, ganoderma, ginger root, golden bell fruit, grape seed extract, grape juice, grapefruit, grapes, honeydew, jasmine flowers, ji tsau herb, Ji-ling Genseng, Jing-jie, kelp, leek seed, lemon, Lentinus edodes (Shiitake Mushroom), licorice, licorice root, lotus seed, Lotus root, loutus leaf, luffa, lycium fruit, magnolia flower, menthol leaf, mint, mongoliavine fruit, morinda root, mulberry, mushroom, orange peel, papermulberry, peach, pear, pear juice, pear juice concentrate, pearl powder, Pearl Extract, peas, peppermint, perilla, pineapple, pineapple juice concentrate, pinellia root, poria (mushroom powder), radish, red date, reed rhizome, reed root, rice sprouts, rice, royal jelly, senega root, siler, silver flower, Soybean, Soybean extract, spinach, Stevia, strawberry, tangerine peel, tomato, vanilla, white willow bark, Wild ginger, and yeuan wu root.

6. The solid dietary supplement of claim 1 wherein said solid dietary product is part of a food product.

7. The solid dietary supplement of claim 1 wherein said solid dietary product is part of a drink or drink mix.

8. The solid dietary supplement of claim 1 wherein said solid dietary supplement is placed within a capsule.

9. The solid dietary supplement of claim 1 wherein said solid supplement is provided in tablet form.

10. A powdered dietary supplement, comprising:
    dehydrated cactus fruit juice; and
    dehydrated ginseng berry juice.

11. The powdered dietary supplement of claim 10 further comprising a natural health promoting ingredient in addition to said dehydrated cactus fruit juice and said dehydrated ginseng berry juice.

12. The powdered dietary supplement of claim 10 further comprising an herbal ingredient in addition to said dehydrated cactus fruit juice and said dehydrated ginseng berry juice.

13. The powdered dietary supplement of claim 10 further comprising ginseng root.

14. The powdered dietary supplement of claim 10 further comprising an ingredient selected from the group consisting of akebia stem, alisma tuber, american lovage root, ammonium seed, angelica root, angelica sinensis (Dong Quai), apple, asparagus, atractykides rhizome, atractylodis root, bamboo leaf, banana, barley sprouts, barley, bee pollen, bell flower root, black bean, blueberry, broccoli, broomrape, burdock seed, cabbage, cactus pads, cactus stems, camellia flower, cantaloupe, carrot extract, carrot, Cassia seed, Cassia toa, Cassia tora extract, Cassia tora, Chinese date, Chinese yam, Chinese lovage root, Chinese catnip, Chinese plum, Chinese Dodder, Chinese Privet, chrysanthemum extract, Chrysanthemum flower, chuan xiong root, chuan xiong, cinnamon bark, citrus peel, cnidium, comel fruit, dong quai, eucommia bark, fang-feng root, fennel seed, forty knot root, ganoderma, ginger root, golden bell fruit, grape seed extract, grape juice, grapefruit, grapes, honeydew, jasmine flowers, ji tsau herb, Ji-ling Genseng, Jing-jie, kelp, leek seed, lemon, Lentinus edodes (Shiitake Mushroom), licorice, licorice root, lotus seed, Lotus root, loutus leaf, luffa, lycium fruit, magnolia flower, menthol leaf, mint, mongoliavine fruit, morinda root, mulberry, mushroom, orange peel, papermulberry, peach, pear, pear juice, pear juice concentrate, pearl powder, Pearl Extract, peas, peppermint, perilla, pineapple, pineapple juice concentrate, pinellia root, poria (mushroom powder), radish, red date, reed rhizome, reed root, rice sprouts, rice, royal jelly, senega root, siler, silver flower, Soybean, Soybean extract, spinach, Stevia, strawberry, tangerine peel, tomato, vanilla, white willow bark, Wild ginger, and yeuan wu root.

15. The powdered dietary supplement of claim 1 wherein said dietary supplement is part of a food product.

16. The powdered dietary supplement of claim 1 wherein said dietary supplement is part of a drink or drink mix.

17. The powdered dietary supplement of claim 1 wherein said powdered dietary supplement is placed within a capsule.

18. The powdered dietary supplement of claim 1 wherein said powdered dietary supplement is provided in tablet form.

19. A food product comprising a powdered dietary supplement, said supplement comprising:

dehydrated cactus fruit juice; and dehydrated ginseng berry juice.

20. The food product of claim 19 wherein said food product is a pasta.

21. The food product of claim 19 wherein said food product is a bread product.

22. The food product of claim 19 wherein said supplement further comprises ginseng root.

23. The food product of claim 19 wherein said supplement further comprises an ingredient selected from the group consisting of akebia stem, alisma tuber, american lovage root, ammonium seed, angelica root, angelica sinensis (Dong Quai), apple, asparagus, atractykides rhizome, atractylodis root, bamboo leaf, banana, barley sprouts, barley, bee pollen, bell flower root, black bean, blueberry, broccoli, broomrape, burdock seed, cabbage, cactus pads, cactus stems, camellia flower, cantaloupe, carrot extract, carrot, Cassia seed, Cassia toa, Cassia tora extract, Cassia tora, Chinese date, Chinese yam, Chinese lovage root, Chinese catnip, Chinese plum, Chinese Dodder, Chinese Privet, chrysanthemum extract, Chrysanthemum flower, chuan xiong root, chuan xiong, cinnamon bark, citrus peel, cnidium, comel fruit, dong quai, eucommia bark, fang-feng root, fennel seed, forty knot root, ganoderma, ginger root, golden bell fruit, grape seed extract, grape juice, grapefruit, grapes, honeydew, jasmine flowers, ji tsau herb, Ji-ling Genseng, Jing-jie, kelp, leek seed, lemon, Lentinus edodes (Shiitake Mushroom), licorice, licorice root, lotus seed, Lotus root, loutus leaf, luffa, lycium fruit, magnolia flower, menthol leaf, mint, mongoliavine fruit, morinda root, mulberry, mushroom, orange peel, papermulberry, peach, pear, pear juice, pear juice concentrate, pearl powder, Pearl Extract, peas, peppermint, perilla, pineapple, pineapple juice concentrate, pinellia root, poria (mushroom powder), radish, red date, reed rhizome, reed root, rice sprouts, rice, royal jelly, senega root, siler, silver flower, Soybean, Soybean extract, spinach, Stevia, strawberry, tangerine peel, tomato, vanilla, white willow bark, Wild ginger, and yeuan wu root.

24. A powdered dietary supplement in capsule form, comprising:

dehydrated cactus fruit juice; and dehydrated ginseng berry juice.

* * * * *

UNITED STATES PATENT AND TRADEMARK OFFICE
CERTIFICATE OF CORRECTION

PATENT NO.    : 6,238,672 B1
DATED         : May 29, 2001
INVENTOR(S)   : Jau-Fei Chen It is certified that error appears in the above-identified patent and that said Letters Patent is hereby corrected as shown below:

<u>Columns 20 and 21,</u>
Claims 15-18 should depend from claim 10 rather than from claim 1.

Signed and Sealed this

Twenty-fifth Day of March, 2003

JAMES E. ROGAN
*Director of the United States Patent and Trademark Office*